June 22, 1948.   F. R. McFARLAND   2,443,688
DRIVE MECHANISM
Filed June 21, 1944
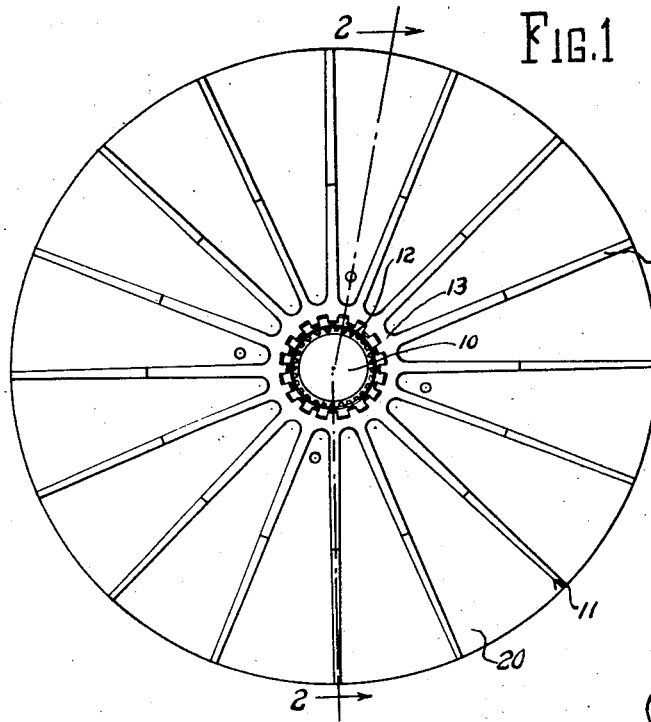
Fig.1
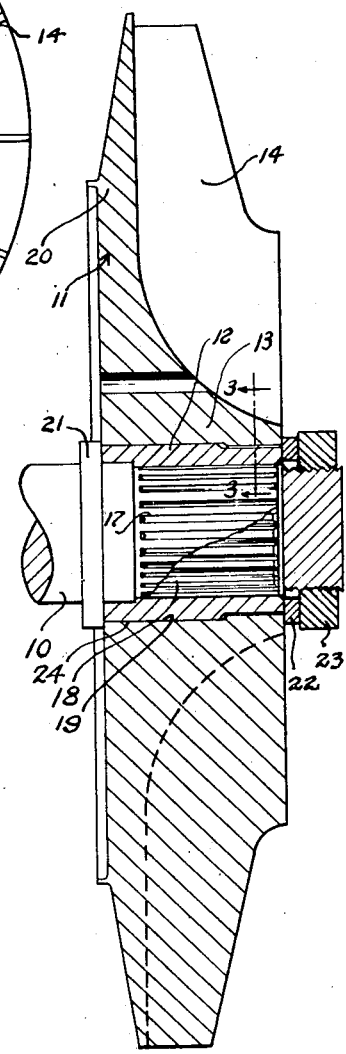
Fig.2
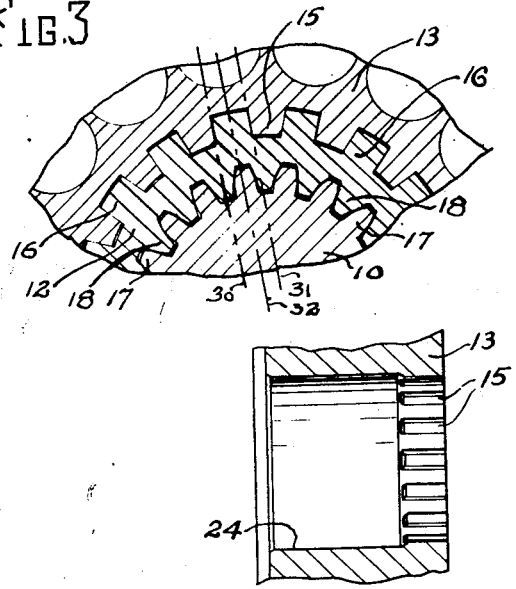
Fig.3
Fig.4
INVENTOR.
FOREST R. McFARLAND
BY
Sibbett & Hart
ATTORNEYS

# Patented June 22, 1948

2,443,688

UNITED STATES PATENT OFFICE

2,443,688

DRIVE MECHANISM

Forest R. McFarland, Huntington Woods, Mich., assignor to Packard Motor Car Company, Detroit, Mich., a corporation of Michigan Application June 21, 1944, Serial No. 541,429

6 Claims. (Cl. 287—53)

This invention relates to drive mechanism and more particularly to impeller drive mechanism for engine supercharger devices.

Impeller devices of engine superchargers rotate at a high maximum speed, such as 25,000 R. P. M., or more, and their operating temperature often reaches 250° Fahrenheit. The impeller is usually formed of relatively soft, light material, such as aluminum, and is connected to be driven by a shaft formed of steel or some similar hard material having a considerably lower coefficient of expansion than that of the impeller. It is essential that balance of impeller devices be maintained, that is, with the center of gravity of the rotating parts maintained on the center line of rotation. Due to operating speed, temperature conditions, the differences in hardness of the rotating parts and their different coefficients of expansion, it has been difficult to provide a drive connection for an impeller device that will maintain balance, and particularly such a connection that can be readily disconnected for inspection or replacement of parts.

An object of the invention is to provide an impeller device of the character referred to in which the parts are connected to maintain balance during all operating conditions.

Another object of the invention is to provide a drive connection between rotating parts of a supercharged impeller device of the character referred to that will maintain balance and permit the parts to be readily disconnected for inspection or replacement.

Another object of the invention is to provide a connection between two parts of a high speed supercharger impeller device, having different hardnesses and coefficients of expansion, that will maintain a positive drive and pilot relation during the varying temperatures and speeds encountered in operation.

Other objects of the invention will appear from the following description taken in connection with the drawings, which form a part of this specification, and in which:

Fig. 1 is a face elevation of an impeller device incorporating the invention;

Fig. 2 is an enlarged sectional view of the device taken on line 2—2 of Fig. 1;

Fig. 3 is an enlarged fragmentary sectional view taken on line 3—3 of Fig. 2 showing the drive connection between the impeller and the shaft;

Fig. 4 is a section through a portion of the impeller hub.

Driving member 10 of the impeller device projects into or through an axially extending opening in driven member 11, and when such device is part of an engine supercharger the driving member is a high speed shaft and the driven member is an accurately balanced impeller. The impeller is usually formed of soft, light material, such as aluminum, and the shaft is formed of steel or some similar hard material having a much lower coefficient of expansion than that of the impeller material. Because of such differences of materials, the high operating speed and temperature encountered, difficulty is found in providing a positive drive connection between the shaft and the impeller that will maintain balance and be readily disconnectible for inspection or replacement. When a splined connection between the two members is employed, it is necessary to bolster the connection by shrink fitting the impeller on the shaft, and the impeller must be expanded by heat in order to remove it from the shaft for inspection or replacement. This heating operation requires considerable time and expert workmanship to prevent heating the shaft and changing its characteristics.

In another form of impeller device, the impeller has a press fit with a sleeve that is splined to the drive shaft and the impeller is positively secured by rivets passing through flanges on the sleeve. The rivets wear the aluminum impeller so that a looseness develops that upsets the balance.

After airplane engines are first assembled they are "run in" for a variable length of time and are then entirely disassembled and the parts inspected before they are reassembled and the engine mounted in an airplane. Because of this procedure, it is of considerable importance that engines for this purpose be designed so that the parts can be readily assembled and taken apart.

In order to provide a pilot and drive connection between the shaft and the impeller that will maintain balance during operation and permit easy separation and reassembly of the parts without distortion or change in their characteristics, a drive member 12 is interposed between the shaft and the impeller. This drive member is in the form of a sleeve formed preferably of metal such as steel having a coefficient of expansion and hardness similar to that of the shaft 10.

The impeller 11 comprises a disk 20, an elongated hub 13 and vanes 14 extending from one face of the disk and the hub. The hub is bored to receive sleeve 12 and is formed with internal splines 15 shown adjacent one end thereof, which splines mate with external splines 16 on the sleeve to provide a positive drive connection. These splines are of the straight side type and each spline of the sleeve has its two contact faces parallel, as indicated by lines 30, 31 in Fig. 3, and parallel to the radial center line of the spline, as indicated by line 32. As the hub splines mate with such sleeve splines they will move radially outwardly without interference when the impeller expands more than the sleeve.

A relatively large portion of the exterior of the sleeve 12 and a similar portion of the interior of the hub 13 are of cylindrical form, and the bore of the hub is formed smaller than the outside diameter of the sleeve, so that in assembling these parts the sleeve may be either pressed into the hub of the impeller or the parts may be assembled by a shrink fit, that is, either by heating the impeller and allowing it to shrink around the sleeve or by shrinking the sleeve by cooling it and allowing it to expand inside the hub. In either case the parts are under a high pressure in their assembled condition and this may be referred to as a press or pressure fit.

By this construction the cylindrical portion of the sleeve 12 forms a continuing pilot or centering means for the impeller and the splined connection which is not pressure fitted retains its drive fit even though the hub portion of the impeller may expand more than the sleeve at that point. At the opposite end of the sleeve and hub the sleeve, by reason of heat and centrifugal force, will expand with the hub by reason of the pressure fit referred to. There may thus be a slightly tapered enlargement or expansion of the cylindrical end of the sleeve but at all times the piloting effect will be maintained.

The shaft 10 is formed with splines 17 that mate with splines 18 on the interior of the sleeve, such splines being illustrated as of involute shape. The impeller assembly abuts a shoulder 21 on the shaft when operatively associated therewith and is secured in such position by nut 23 screwed on the threaded end of the shaft projecting through the sleeve. A ring spacer 22 is arranged between the nut and the adjacent side of the impeller assembly.

The press or shrink fit relation of the impeller on the sleeve provides a drive connection and causes the sleeve to serve as a pilot for the impeller as stated above. The splines between the shaft and the sleeve serve as a drive connection and as a pilot for the sleeve. As the shaft and sleeve have substantially the same coefficient of expansion and hardness, their initial assembled relation will not be changed by temperature variation or by wear that would result if the parts were formed of material having different hardnesses.

It will thus be seen that with this construction there is always a proper driving and piloting condition between the driving shaft 10 and the sleeve 12 by reason of the splined connection and the fact that these two members are made of substantially the same material, and there is likewise always a proper driving and piloting connection between the sleeve 12 and the impeller 11, this by reason of the splined arrangement at one end, with the splines having the parallel sides, and the press or shrunk fit between the long cylindrical portion of the sleeve and the hub. Also, the splined connection between the shaft and sleeve of similar material permits of easy assembly and disassembly of those parts for inspection and renewal.

It will be understood that various forms of the invention other than that described above may be used without departing from the spirit or scope of the invention.

What is claimed is:

1. In an impeller device, the combination with a rotary driving member and a driven member having an axially extending opening into which the driving member extends, said driven member having a higher coefficient of expansion than the driving member, of a drive sleeve between said members having a coefficient of expansion and hardness similar to that of the driving member, said sleeve having a splined driving connection with the driving member and having splined and pressure fit connections with the driven member, the pressure fit and splined relation of the sleeve and the driven member piloting and driving the driven member under varying operating temperatures.

2. In an impeller device, the combination with a driving shaft and an impeller formed of softer material and having a higher coefficient of expansion than the shaft, of a drive sleeve having a splined connection with the shaft and having splined and press fit drive connections with the impeller.

3. In an impeller device, the combination with a drive sleeve and an impeller having a hub mounted on said sleeve, said impeller having a higher coefficient of expansion than the sleeve, of mating splines connecting a portion of the sleeve and the impeller hub, each spline on the sleeve having its contact faces parallel and parallel to its radial center line, and a press fit drive connection between another portion of the sleeve and the impeller hub.

4. In an impeller device subject to widely varying temperature conditions in operation, the combination with a drive shaft element and an impeller element having a higher coefficient of expansion than the drive shaft element, of a sleeve connecting said elements, said sleeve having a coefficient of expansion similar to that of one of said elements, the connection of said sleeve to one of said elements comprising interengaging splines and the connection of said sleeve to the other of said elements comprising interengaging splines throughout a portion of the length of the sleeve and a pressed driving fit between another portion of said sleeve and said other element.

5. In an impeller device subject to widely varying temperature conditions in operation, the combination with a drive shaft and an impeller having a higher coefficient of expansion than the drive shaft, of a sleeve connecting said drive shaft and said impeller, said sleeve having a coefficient of expansion similar to that of the drive shaft, the connection of said sleeve to said drive shaft comprising interengaging splines and the connection of said sleeve to said impeller comprising interengaging splines and a piloting pressed driving fit.

6. In an impeller device subject to widely varying temperature conditions in operation, the combination with a drive shaft and an impeller having a higher coefficient of expansion than the drive shaft, of a sleeve connecting said drive shaft and said impeller, said sleeve having a coefficient of expansion similar to that of the drive shaft, the connection of said sleeve to said drive shaft comprising interengaging splines and the connection of said sleeve to said impeller comprising interengaging splines throughout a portion of the length of the sleeve and a pressed driving fit between another portion of said sleeve and said impeller.

FOREST R. McFARLAND.

REFERENCES CITED

The following references are of record in the file of this patent:

UNITED STATES PATENTS

| Number | Name | Date |
| --- | --- | --- |
| 1,288,136 | Neuteboom | Dec. 17, 1918 |
| 1,370,073 | Utz et al. | Mar. 1, 1921 |
| 2,266,283 | Spengler | Dec. 16, 1941 |
| 2,279,954 | Sipe | Apr. 14, 1942 |